Jan. 28, 1941.  E. FREYSSINET  2,230,032
UNDERGROUND TUBULAR STRUCTURE AND METHOD OF MAKING THE SAME
Filed June 30, 1939  2 Sheets-Sheet 1
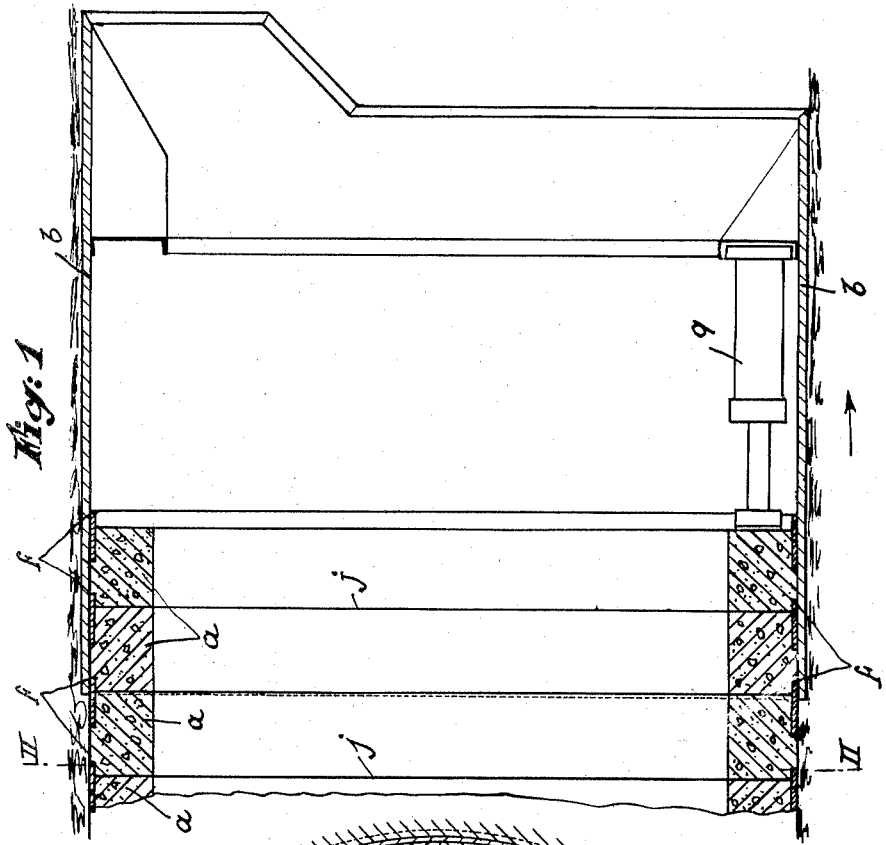
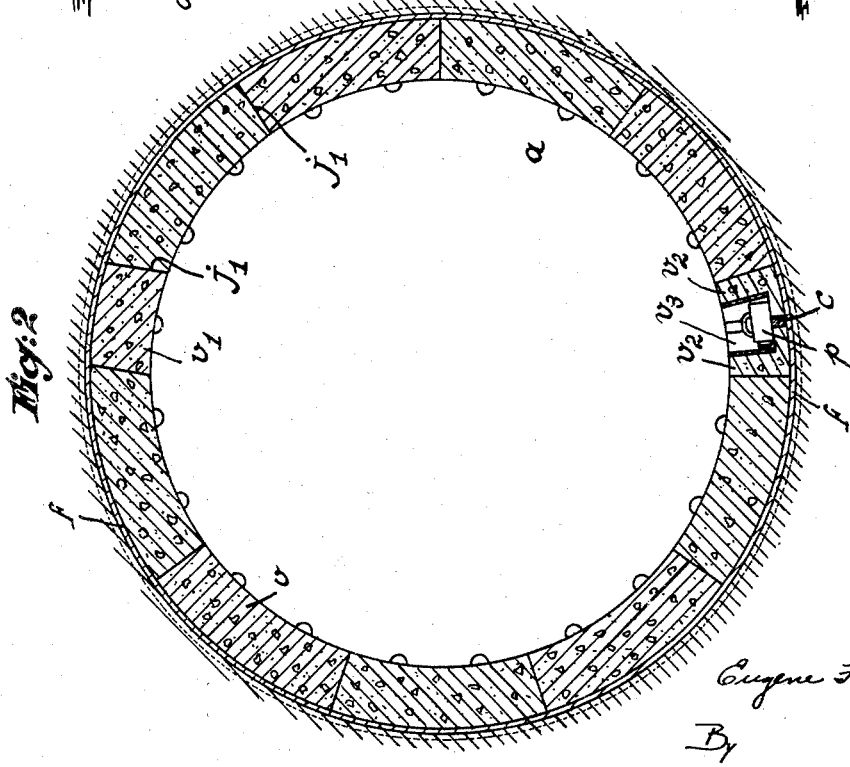
Eugene Freyssinet
By Watson, Cole, Grindle & Watson
ATTYS Jan. 28, 1941.  E. FREYSSINET  2,230,032
UNDERGROUND TUBULAR STRUCTURE AND METHOD OF MAKING THE SAME
Filed June 30, 1939  2 Sheets-Sheet 2
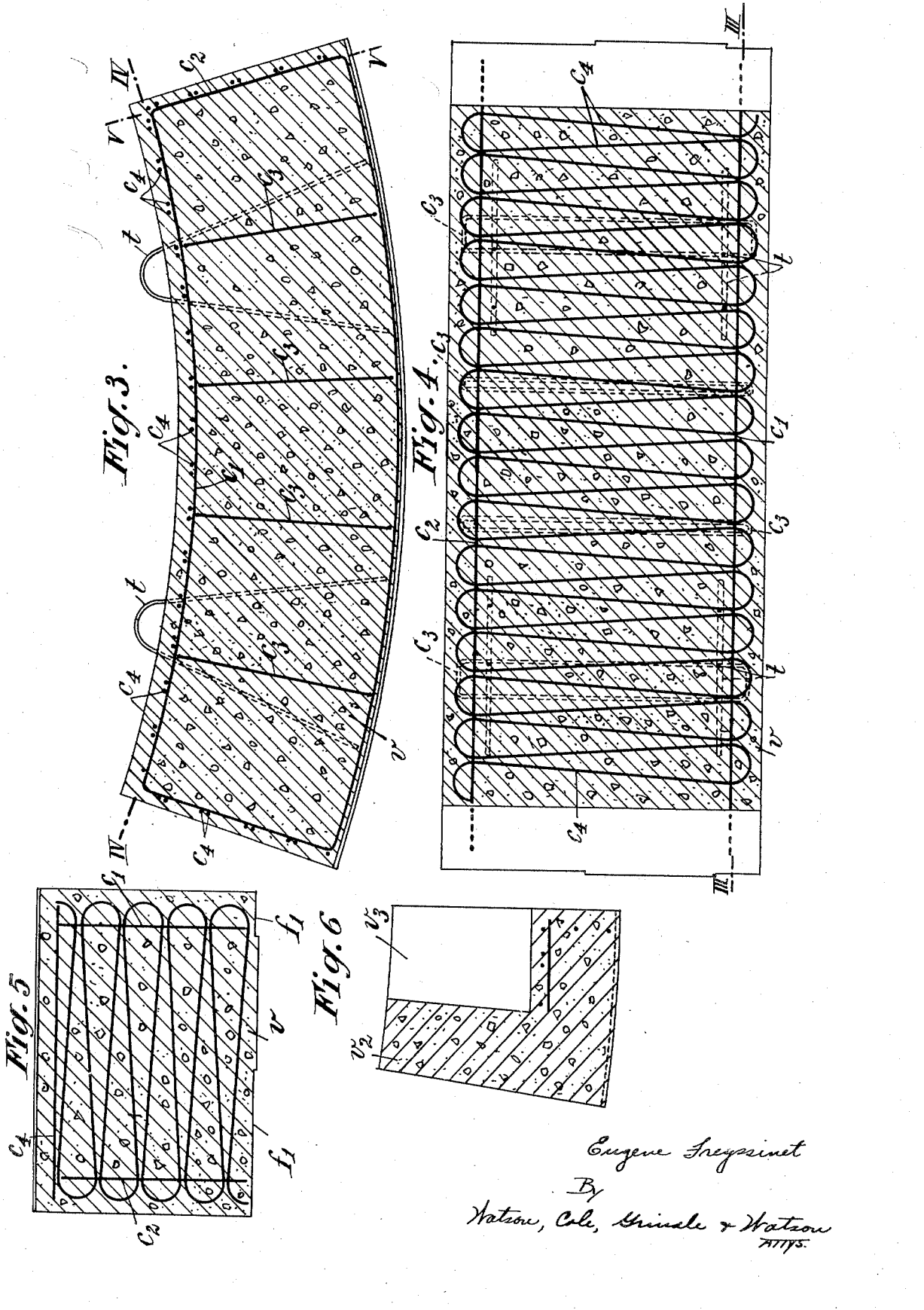

Patented Jan. 28, 1941

2,230,032

UNITED STATES PATENT OFFICE 2,230,032

UNDERGROUND TUBULAR STRUCTURE AND METHOD OF MAKING THE SAME

Eugène Freyssinet, Neuilly-sur-Seine, France, assignor to Enterprises Campenon Bernard, Paris, France, a company of France Application June 30, 1939, Serial No. 282,267
In France July 13, 1938

5 Claims. (Cl. 61—45)

The present invention concerns a method of making underground galleries or conduits.

The object of the invention is to provide a method of this kind which is better adapted to meet the requirements of practice, especially when working in damp ground.

According to an essential feature of the present invention, these galleries or conduits are made in successive ring sections the elements of which, such as voussoirs, preferably made of high resistance concrete, are kept in compression by steel hoops, these hoops being set in tension under the effect of an expansion of the rings, by means of a jack acting between two voussoirs or between the parts of a voussoir made of two pieces, the joint or interval existing at the place where the jack is to be inserted being eventually filled by a wedge after the ring section has been expanded so as to permit the removal of the jack.

According to another feature of the present invention, the hoops are arranged in such manner as to overlap the joints between two successive ring sections, which ensures a connection between the ring sections.

The galleries and conduits thus made according to this method also constitute an object of the invention.

As above stated, the invention is particularly interesting in its application to the construction of galleries, for instance by means of shields, in damp ground, and in particular for the construction of galleries under rivers.

In the following description, it will be supposed that the invention is applied to such a particular case.

Other features of the present invention will result from the following detailed description of some specific embodiments thereof.

Preferred embodiments of the present invention will be hereinafter described, with reference to the accompanying drawings, given merely by way of example, and in which:

Fig. 1 diagrammatically shows, in axial section, the end of a gallery, on the side where it is to be pursued, this view also showing the shield used for this purpose.

Fig. 2 is a sectional view of a ring on the line II—II of Fig. 1;

Fig. 3 shows an embodiment of a high resistance concrete voussoir to be used in connection with the present invention, on the line III—III of Fig. 4;

Fig. 4 is a sectional view on the line IV—IV of Fig. 3;

Fig. 5 is a sectional view on the line V—V of Fig. 3;

Fig. 6 is a cross section of one half of a voussoir made of two pieces for the mounting of a jack.

As shown by the drawings, the gallery is made of successive sections $a$. Each of them is constituted by a plurality of voussoirs $v$, one of which, to wit $v_1$, constitutes the keystone, while another, to wit $v_2$ is made of two pieces and is provided with a recess of housing $v_3$ for accommodating a jack $p$, for instance a hydraulic jack. These voussoirs may be made of high resistance concrete, treated for instance by vibration and compression.

Each of the ring sections is hooped on the outside by means of steel hoops $f$ which are set under tension by stretching the ring sections. The stretching of a hoop section is obtained by admitting a fluid under pressure into jack $p$, in such manner as to move the two parts of voussoir $v_2$ apart from each other. Once a sufficient tensioning has been obtained in the hoops, the space between the two parts of this voussoir $v_2$ is filled up, either by means of a wedging piece $c$, made of mortar, or preferably by means of dry mortar. The pressure in the jack can then be relieved, and the jack is removed so that it can be utilized in connection with the next ring section. Piece $c$, or the mass of mortar used in place of it, keeps the hoop under tension.

As shown by Fig. 1, each hoop is arranged in such manner as to overlap the joint $j$ between two successive ring sections. It follows that the permanent compression of the concrete voussoirs, obtained through the action of tensioned hoops, simultaneously produces two results:

$a$. First, the joints $j_1$ between the voussoirs of a given ring section are made fluidtight due to the fact that they are compressed against one another by said hoops;

$b$. Secondly, the friction of the metal under tension upon the compressed concrete, at the place of the joints $j$ between successive ring sections, provides the longitudinal connection of the ring sections with one another. In this way, I obtain, owing to the action of the hoops, a structure which acts exactly as a monolith concerning the longitudinal and transverse stresses.

In case of need, fluidtightness can be further improved by interposing, between the hoops and the voussoirs, and, eventually, between the voussoirs themselves, a plastic material which cannot be destroyed by the action of water, such for instance as a bitumen.

As shown by Fig. 1, each hoop is advantageously arranged in such manner that the area over which it bears on the ring section located on the side toward which the work is proceeding is smaller than the area over which it bears on the preceding ring section.

I have shown in Fig. 1 a shield $b$ located at the end of the gallery on the side toward which said gallery is proceeding and under the protection of which the ring sections are formed as the work is being pursued.

In Fig. 1, the shield is illustrated at the time when, in view of the fact that there is a sufficient number of ring sections $a$ (for instance two ring sections) on the inside thereof, it has been moved forward by means of the jacks $q$ with which it is provided, which jacks bear against the last ring section $a$ that has been completed. Once this forward movement has been carried out, these jacks $q$ are brought out of action, and the next ring section is formed by placing its voussoirs inside the preceding hoop, which is already secured and tensioned on the preceding ring section $a$. These voussoirs are then subjected to compression by means of jack $p$. Wedging member $c$ is inserted in position, jack $p$ is removed, another ring section is formed, and so on, two successive series of a suitable number of ring sections being separated from each other by a forward displacement of the shield.

Figs. 3 to 5 show, by way of example, a concrete voussoir to be used in connection with the present invention. This voussoir is reinforced by two longitudinal frames $c_1$ and $c_2$, by a plurality of transverse frames $c_3$, and finally by wires $c_4$ arranged in zig-zag fashion around said frames and ensuring resistance to compression stresses. Stirrup-shaped members $t$ embedded in the concrete of which the voussoirs are made serve to facilitate their handling and to fix them temporarily, during their assembly, to the preceding ring, by means of iron bars which overlap several ring sections and are passed through these stirrup-shaped members. The voussoirs according to the invention further include, on their convex surfaces grooves $f_1$ for the fitting of the hoops in position such grooves being visible in Fig. 5.

In Fig. 6 I have shown one of the two halves of a voussoir $v_2$ made of two pieces, this element being provided with a recess $v_3$ which serves to accommodate the jack.

According to the tensional stresses which are considered necessary for the compression of the concrete of the voussoirs, the hoops may be made of soft, or mild, steel, semi-hard steel, or hardened steel.

In a general manner, while I have, in the above description, disclosed what I deem to be practical and efficient embodiments of the present invention, it should be well understood that I do not wish to be limited thereto as there might be changes made in the arrangement, disposition, and form of the parts of the present invention as comprehended within the scope of the appended claims without departing from the principle of said invention.

What I claim is:

1. A method of making underground tubular structures such as galleries or conduits, consisting in forming a series of annular sections by butt-joining each new section to the one previously formed, each pair of butt-joined sections being provided on their outer periphery with a hoop straddling the butt-joint thereof, and expanding each newly formed section from within so as to expand each respective newly placed hoop, thereby insuring tightness of the respective butt-joint.

2. A method of making underground tubular structures, such as galleries or conduits, by means of hooped butt-joined annular sections, consisting in placing axially in front of the section previously installed a hoop adapted to overlap the forward end of a new section to be formed, forming this new section within said hoop and within the hoop overlap of the said section previously installed, expanding this newly formed section from within so as to expand the last placed hoop, thereby insuring tightness of the butt-joint between the newly formed section and said previously installed section, and repeating such operations as many times as necessary for producing the desired length of the tubular structure to erect.

3. A method of making underground tubular structures, such as galleries or conduits, by means of hooped butt-joined annular sections, consisting in placing axially in front of the section previously installed a hoop adapted to overlap the forward end of a new section to be formed, forming this new section with a plurality of wedge-like segmental components, such as voussoirs, within said hoop and within the hoop overlap of the said section previously installed, expanding this newly formed section by thrusting asunder two of said components and fixing the latter in their sundered position so as to expand the last placed hoop and keep it in its expanded position, thereby insuring tightness of radial butt-joints between said components of said newly formed section and tightness of the butt-joint between the newly formed section and the said section previously installed, and repeating such operations as many times as necessary for producing the desired length of the tubular structure to erect.

4. A method of making underground tubular structures, such as galleries or conduits, by means of hooped butt-joined annular sections, consisting in placing axially in front of the section previously installed a hoop adapted to overlap the forward end of a new section to be formed, forming this new section with a plurality of wedge-like segmental components, such as voussoirs, within said hoop and within the hoop overlap of the said section previously installed, introducing a jack between two movable elements of said components to thrust them asunder for expanding both the newly formed section and the last placed hoop, placing a wedging element between said two elements thrust asunder for maintaining both said section components and the hoop in expanded position, thereby insuring tightness of radial butt-joints between said section components of said newly formed section and tightness of the butt-joint between the newly formed section and the section previously installed, and repeating such operations as many times as necessary for producing the desired length of the tubular structure to erect.

5. An underground tubular structure, such as a gallery or conduit, comprising a series of butt-joined annular sections and a series of hoops arranged on the outer periphery thereof so as to overlap the joints therebetween and expanded from within said sections to maintain tight said joints.

EUGÈNE FREYSSINET.